United States Patent [19]
Beck et al.

[11] Patent Number: 5,802,150
[45] Date of Patent: Sep. 1, 1998

[54] COMMUNICATION CONTROL BOARD WITH AUDIO FUNCTIONS

[75] Inventors: Gregory F. Beck, Laguna Hills; Richard D. Ray, Laguna Niguel, both of Calif.

[73] Assignee: Canon Kabushiki Kaisha, Tokyo, Japan

[21] Appl. No.: 341,165

[22] Filed: Nov. 16, 1994

Related U.S. Application Data

[63] Continuation of Ser. No. 5,554, Jan. 19, 1993, abandoned.
[51] Int. Cl.[6] .................................................. H04M 11/00
[52] U.S. Cl. .......................... 379/93; 379/88; 379/96; 379/98; 379/100
[58] Field of Search ........................ 379/93, 96, 97, 379/98, 100, 94, 67, 88, 89

[56] References Cited

U.S. PATENT DOCUMENTS

| | | | |
|---|---|---|---|
| 4,837,798 | 6/1989 | Cohen et al. | 379/88 |
| 4,961,212 | 10/1990 | Marui et al. | 379/67 |
| 4,996,707 | 2/1991 | O'Malley et al. | 379/100 |
| 5,048,076 | 9/1991 | Maurer et al. | 379/94 |
| 5,192,999 | 3/1993 | Graczyk et al. | 379/93 |

OTHER PUBLICATIONS

"RC96V24AC Modem Designer's Guide (Preliminary)", Rockwell International Digital Communications Division, May 7, 1992.

"Mwave Multimedia Platform for AT–Compatible Computers", Product Release Brochure from Atlanta Signal Processors, Inc., Atlanta, Georgia, Oct. 1992.

"TyIN2000: Tie–It–All–Together", Product Release Brochure from National Semiconductor, Santa Clara, California, Oct. 1992.

Product Announcement re Antex Model Z1 from Antex Electronics Corp., InfoWorld, vol. 14, Issue 49, p. 37.

Product Announcement re Antex Model Z1 from Antex Electronics Corp., Process Communications Ltd., vol. 8, Issue 2, p. 8.

Technical Data Sheets re Series 3 Model Z1 Multimedia Digital Audio Adapter, from Antex Electronic Corp., Antex Digital Audio.

Technical Data Sheets re ZyXEL U–1496B Modem/Fax Card, from ZyXEL Communications Corp.

"Next Generation Communication Boards", G. Keister, Electronic Component News, July 1993.

*Primary Examiner*—Curtis Kuntz
*Assistant Examiner*—Stephen W. Palan
*Attorney, Agent, or Firm*—Fitzpatrick, Cella, Harper & Scinto

[57] ABSTRACT

A communications control board, has, provided on a single board, an arrangement for performing standard modem/facsimile/telephone control functions as well as circuitry for performing functions, such as audio play and audio-line input and output functions. In one embodiment, a soundboard may be provided with text-to-speech control functions in conjunction with the single-board controller.

14 Claims, 6 Drawing Sheets

COMMUNICATION CONTROL BOARD WITH AUDIO FUNCTIONS

This application is a continuation of application Ser. No. 08/005,554 filed Jan. 19, 1993, now abandoned.

BACKGROUND OF THE INVENTION

1. Field of the Invention

The present invention relates to communication control, more particularly to apparatus for controlling communication functions, and more specifically to controller boards associated with personal and other desktop computers that are suitable for controlling data, voice, image and multimedia communication functions.

2. Description of the Related Art

There are many communication controller board products adapted for use with computing, equipment such as IBM and IBM-compatible personal computers, which boards perform integrated modem/facsimile/telephone control functions. Other controller boards have been designed to perform digital sound functions such as simple digital recording and playback rather than the aforementioned modem/facsimile/telephone control. Some examples of modem/facsimile/voice controller board products are available from Complete PC, Speaking Devices and Zyxel. These controller board products, however, do not provide audio-line-level input, and do not provide audio-line-level output.

Sound boards (e.g., SoundBlaster) have been developed that do accept microphone or audio-line-level input and can drive a speaker for output. These boards which digitally record and play sound, however, do not perform telephone control of the type required to record and play via a telephone line or handset, and likewise do not perform modem or facsimile functions.

It would be desirable to provide a single-board communications controller board which integrates modem/facsimile/telephone control functions with microphone input, audio-line-level input and output and standard voice (speaker) output functions.

Also, many people are familiar with different systems by means of which a person calling a number can be given directions to input commands via a dual-tone, multiple-frequency ("DTMF") system. Telephone reception systems are encountered, for example, on which a caller is greeted by a predetermined message such as "Hello, you have reached CIS Inventors; to leave a voice message press 1, to leave a fax message press 2, to receive voice mail, press 3," etc. In conventional systems of that type, the messages are played out from small snippets of recorded human voice or may be pre-recorded by a human voice in their entirety. The assignee of the present invention has recently provided a system of this general type, but in which a text-to-speech capability is provided. That is, in the commonly-assigned text-to-speech system, outgoing messages need not be pre-recorded, and need not originate in the form of an actual human voice, but can be generated synthetically in any desired way, and can be made up by simply striking keys on a computer keyboard to provide a string of ASCII characters spelling out the messages. The commonly-assigned system to which reference has been made is disclosed in application Ser. No. 07/978,440, filed Nov. 16, 1992, in the names of William Luther, Thomas Tullis, Loren Wood and Jim Fontana. The present disclosure includes hardware which may be used to implement such a text-to-speech system.

SUMMARY OF THE INVENTION

It is the principal object of the present invention to provide a hardware circuit on a single board, capable of performing standard integrated modem/facsimile/telephone control functions, as well as audio input and output control functions. Most preferably, the functions provided will include microphone and audio-line-level input, as well as audio-line-level output and speaker output.

It is another object of the invention to provide a hardware device which can be used to carry out a text-to-speech system as described above.

According to one aspect of the invention, a controller board is provided which includes a single board that performs both integrated modem/facsimile/telephone control and audio play and audio-line-level functions.

According to another aspect of the invention, a control includes a first controller board that performs both integrated modem/facsimile/telephone control and audio play and audio-line-level functions, a sound board that converts text to speech and provides digital-to-analog conversion ("DAC") of the converted text according to an appropriate algorithm and a transfer arrangement that supplies the result of the text-to-speech conversion back to the first controller board as, preferably, an audio-line-level signal suitable for use with conventional telephone and audio systems.

Other objects, features and advantages of the present invention will be more fully understood from a consideration of the following detailed description of the preferred embodiments, taken together with the accompanying drawings.

DETAILED DESCRIPTION OF THE PREFERRED EMBODIMENTS

Figure 1:
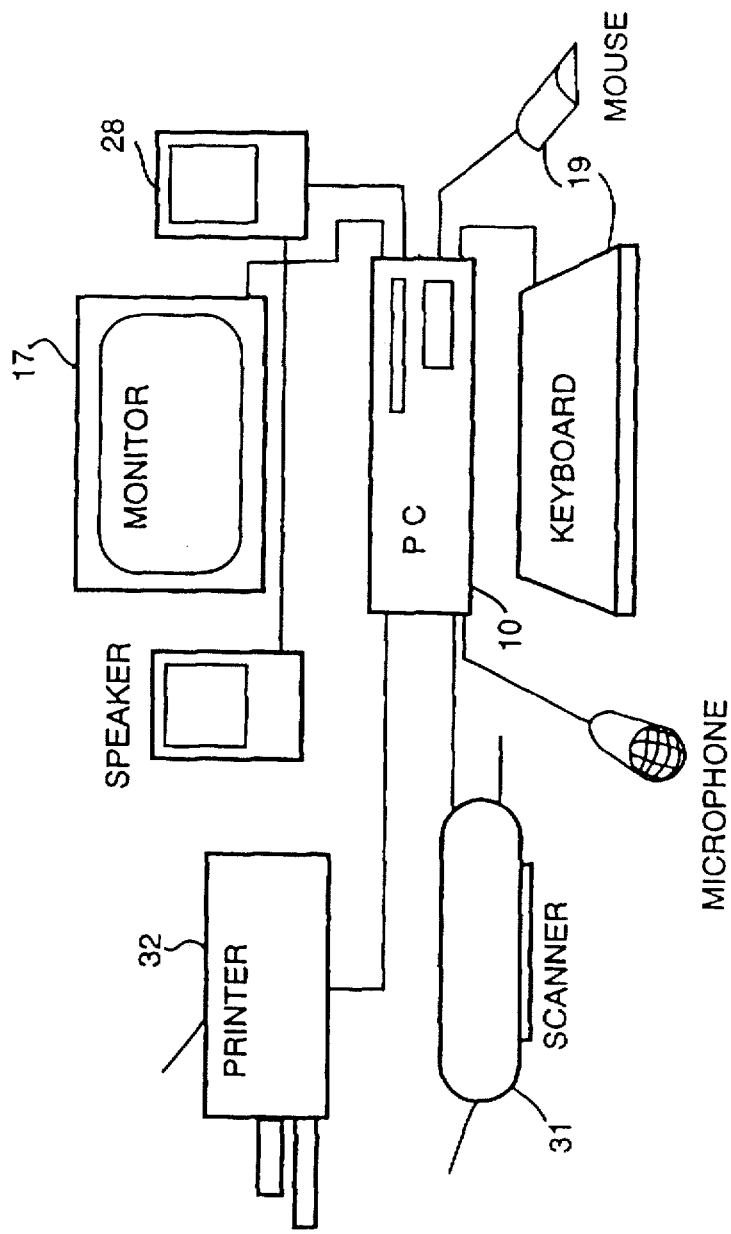
FIG. 1 is a perspective view of the outward appearance of an apparatus illustrative of a communication arrangement for a personal computer facility in which the present invention is incorporated.

FIG. 1 shows the physical arrangement of a personal computer facility with communication control functions. Referring to FIG. 1, reference numeral 10 designates a personal computer such as an IBM PC or PC-compatible type. Reference numeral 17 designates a monitor coupled to the personal computer 10. Reference numeral 28 designates speakers coupled to the personal computer 10. Reference numeral 19 designates a keyboard/mouse input that is coupled to the personal computer 10. Reference numeral 40 designates a microphone coupled to the personal computer 10 for voice input thereto. Reference numeral 31 designates a scanner coupled to the personal computer 10 for inputting images and reference numeral 32 designates a printer coupled to the personal computer 10 for text output therefrom. It should be understood that although a programmable general purpose computer arrangement is shown in FIG. 1, dedicated or stand-alone computer or other data processing equipment may be used in practicing the invention.

Figure 2:
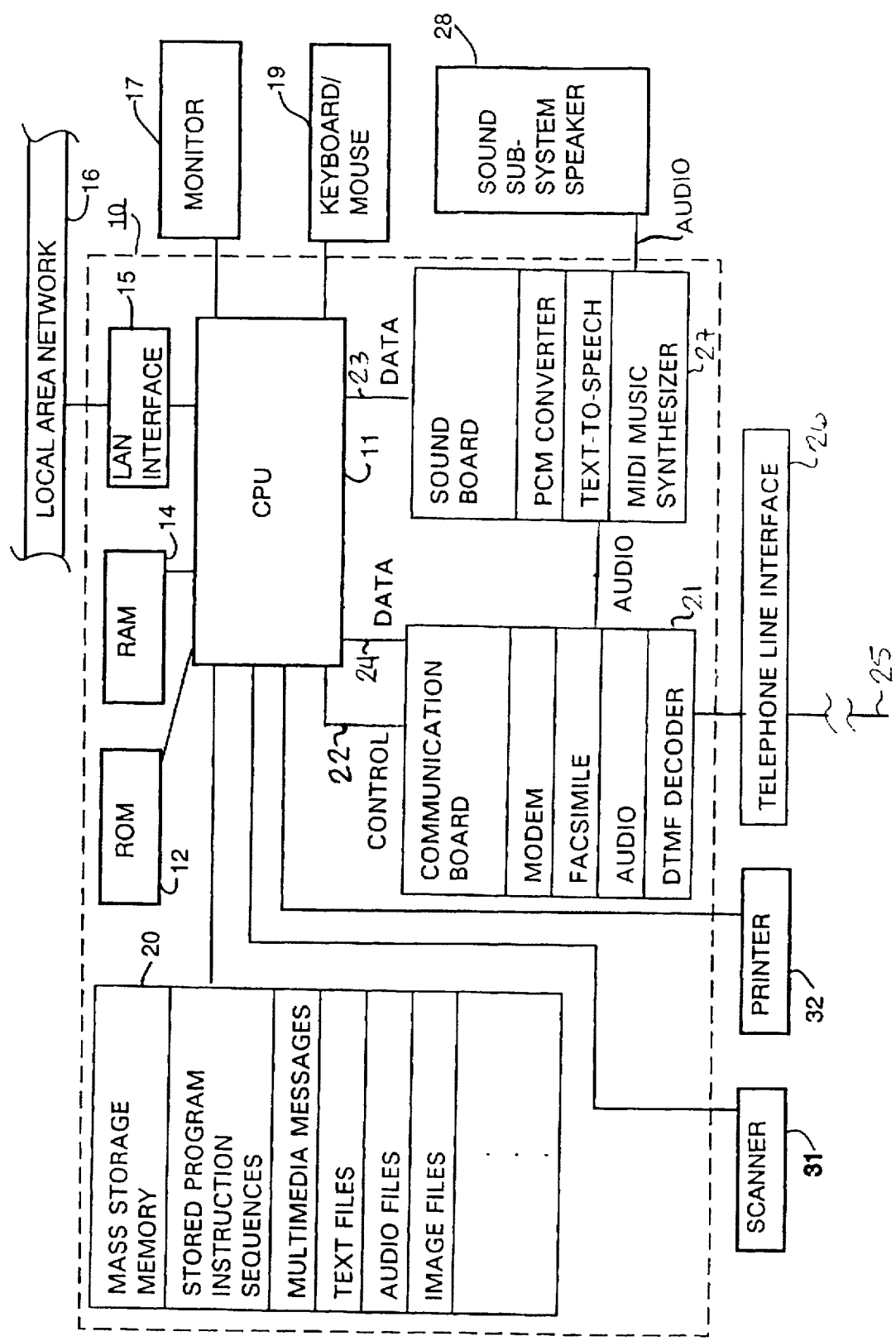
FIG. 2 is a general block diagram of the apparatus shown in FIG. 1.

FIG. 2 shows a block diagram of the apparatus of FIG. 1 and connections to telephone and local area networks. Referring to FIG. 2, the personal computer 10 includes a central processing unit (CPU) 11, a read only memory (ROM) 12, a random access memory (RAM) 14, a local area network (LAN) interface 15 coupled to a local area network 16, a mass storage memory 20, a communication board 21 that is also coupled to a telephone line interface 26 and a sound board 27.

In FIG. 2, the ROM 12, the RAM 14, the LAN interface 15, the monitor 17, the mass memory 20, the keyboard/mouse 19, the scanner 31 and the printer 32 are coupled through appropriate interfaces to the CPU 11. The communication board 21 is coupled to CPU 11 through a control line 22 and a data line 24 which may carry facsimile and/or modem data. The sound board 27 is coupled through a data line 23 to CPU 11, to the speaker 28 through an analog audio signal line and to the communication board 21 through another analog audio signal line.

CPU 11 may be a data processor such as the 80386 processor adapted to execute stored program instructions stored in the RAM 12 or specialized functions stored in the ROM 14. The local area network interface 15 provides an interface to the local area network 16 so that personal computer 10 can interact with the local area network which interaction may include electronic mail transfer and accessing files from a file server (not shown) which may be text files for enunciation over telephone lines by means of text-to-speech conversion. Monitor 17 is adapted to display graphic images and the keyboard/mouse 19 permits inputting of information by an operator and designation of areas on the monitor 17.

Mass storage memory 20 which may be a fixed disk or a floppy disk drive typically includes stored program instruction sequences. In accordance with the invention, such instruction sequences may include sequences operative to retrieve text lines for enunciation over voice telephone lines as controlled by DTMF commands issued by a remote operator as well as other sequences to execute application programs. The mass storage memory 20 may further store multimedia messages that include text, audio and image components in a single message format as well as other arbitrary text and audio files. Text files and text components of multimedia files can be converted to sound files for enunciation or play over voice telephone lines.

Modem, facsimile and audio capability is provided by the communication board 21 so that the CPU 11 can be interfaced with a telephone line 25 through telephone interface 26. Data transfer to and from the CPU 11 for modem and facsimile modes of operation is provided by fax/modem data bus 24. CPU 11 can send and receive binary data or document image files in modem mode, send and receive facsimile messages in facsimile mode in cooperation with communication board 21 and send and receive audio waveforms in cooperation with communication board 21 and/or sound board 27. A DTMF decoder may be provided to decode DTMF tones from telephone line 25. Such decoded tones are then interpreted by the CPU 11 as control signals which are executed to take prescribed actions according to operator action at a remote telephone keypad.

The sound board 27 is adapted to receive pulse code modulated ("PCM") data from CPU 11 through data line 23 and to convert the PCM data to analog audio signals which may be applied to sound board 27 and/or communication board 21. The sound board 27 is also adapted to convert text files from CPU 11 into PCM coded speech through text-to-speech arrangements well known in the art and then convert the PCM coded speech into an analog audio speech signal. A MIDI ("Musical Instrument Digital Interface") synthesizer may also be provided to convert MIDI files to an analog audio music signal.

The scanner 31 operates to scan original documents and to convert the document information into a bit-by-bit computer readable representation of the document. While the scanner 31 may be a black and white scanner, it is preferred that the scanner can perform at least half-tone (grey scale) and/or color processing. Printer 32 forms images of documents under control of the CPU 11 and can be simply a black and white printer or be capable of half-tone and/or color processing.

Figure 3:
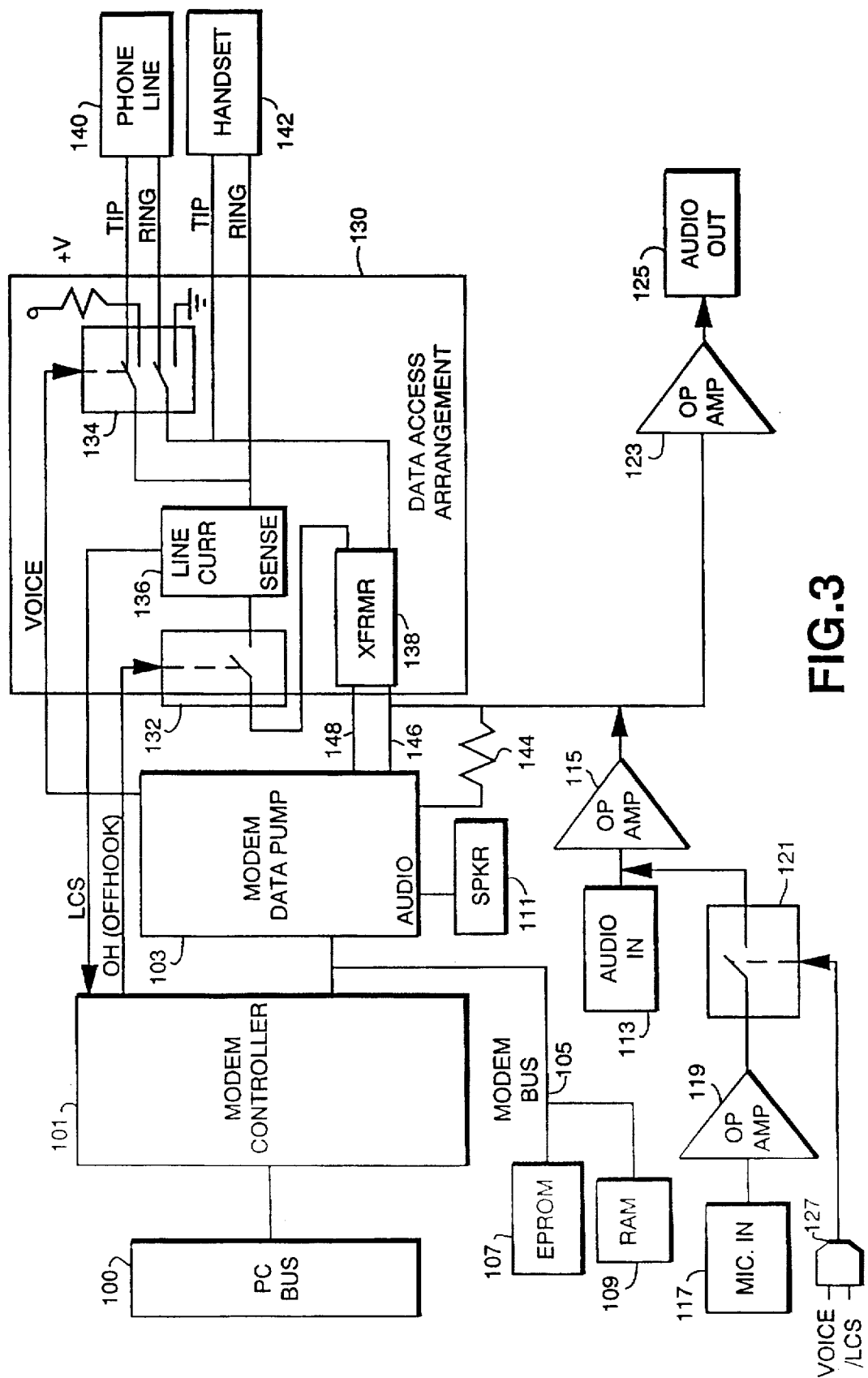
FIG. 3 is a block diagram of a first embodiment illustrative of the invention.

FIG. 3 depicts a communication board illustrative of the first embodiment of the present invention which may serve as communication board 21 in the apparatus of FIG. 2. In FIG. 3, reference numeral 100 designates a PC bus 100 that couples the communication board to the CPU 11 of FIG. 2. A modem controller 101, a modem data pump 103, a modem bus 105 coupling the modem controller 101, the modem data pump 103, an electrically programmable read only memory (EPROM) 107 and a RAM 109 in FIG. 3 form a modem chip set of the type described in the RCC96V24AC Modem Designer's Guide, Rockwell International Digital Communications Division published in 1992. EPROM 107 and RAM 109 serve as memories for programming and processing operations of the modem and each may have a capacity of 128 kbytes. Also in FIG. 3 are a data access arrangement 130 that includes off-hook relay 132, voice mode relay 134, a line current sensor 136 and an impedance transformer 138. An audio path in FIG. 3 includes a speaker 111, an audio line input jack 113, a microphone input jack 117, operational amplifiers 115, 119 and 123, a transistor switch 121, an AND circuit 127, an audio output jack 125, a telephone line 140 and a telephone handset 142.

PC bus 100 is coupled to the modem controller 101 which is further coupled to the modem data pump 103. The microphone input jack 117 is coupled through the operational amplifier 119 and transistor switch 121 to an input of operational amplifier 115 and the audio input jack is also coupled to the input of operational amplifier 115. An output of operational amplifier 115 is coupled to an input of operational amplifier 123 and an output of operational amplifier 123 is coupled to the audio output jack 125. The output of operational amplifier 115 is also coupled to an input of the modem data pump 103 through lead 146 and to another input of the modem data pump through an impedance 144. The relay 134 of data access arrangement 130 is switchably connected between line current sensor 136 and phone line 140 and the handset 142 is connected to the line current sensor 136 and transformer 138. A control lead of relay 134 is connected to a voice control output of the modem data pump 103. The relay 132 is connected between the line current sensor 136 and the transformer 138 and has a sense output connected to an input of the modem controller 101.

In operation, modem control commands are received by modem controller 101 from CPU 11 of FIG. 2. The modem control commands configure the modem controller 101 and the modem data pump 103 to perform data transfer in modem, facsimile or audio modes.

In an audio mode of operation when the handset 142 is on-hook and a voice mode control signal in the modem data pump 103 is disabled, line current sensor 136 detects line current and causes the modem controller 101 to generate an off-hook signal which closes off-hook relay 132. A tip lead of phone line 140 is then connected to the transformer 138 through relay 134, line current sensor 136 and the contact of relay 132 and a ring lead of the phone line 140 is connected to the transformer 138 through relay 134. As a result, the telephone line 140 is coupled to the modem data pump 103 through leads 146 and 148.

In the audio mode with the telephone line connected, the modem data pump 103 may be configured to convert an audio signal from the telephone line 140 into an adaptive differential pulse code modulated (ADPCM) data stream which is transferred to CPU 11 through PC bus 100 and recorded in a voice file in mass memory 20. ADPCM voice files may be selected for play-back to the telephone line 140 in the audio mode with the handset 142 on-hook and the voice control signal disabled by means of program control through CPU 11 and modem commands therefrom to the modem controller 101.

When the play-back is activated, the ADPCM voice file is converted into an audio signal by the modem data pump 103 and coupled through the data access arrangement 130 to the telephone line 140. During the record and playback for telephone line 140, signals from microphone in jack 117 and audio line in jack 113 can be supplied to the modem data pump 103 and the data access arrangement 130 through operational amplifiers 119 and 115. The audio signal at the junction of the modem data pump 103 and the data access arrangement 130 is output to the audio line out jack 125 through impedance 144 and operational amplifier 123. The handset 142 may be placed off-hook and connected to the telephone line 140 during the modem audio mode operation.

The communication board of FIG. 3 may be operated in a local mode (i.e., telephone line disconnected) by applying a modem command signal from CPU 11 of FIG. 2 to the modem controller 103 that causes the modem data pump to activate the voice control signal. The contacts of the relay 134 close in response to program control so that the telephone line 140 is disconnected from the transformer 138. A supply voltage +V is then applied to one input of transformer 138 through the line current sensor 136 and another input of transformer 138 is connected to a reference potential such as ground. The communication board then operates to couple the telephone handset 142, the audio line input jack and the microphone input jack to the modem data pump 103 and to the audio line output jack 125.

In the local audio mode operation with the telephone handset on-hook, audio signals applied to the audio line input 113 from a sound board or the like and signals applied to the microphone input 117 are mixed and amplified to produce an audio line level signal (i.e., 1 volt peak to peak). The audio line level signal is supplied to the modem data pump 103 via lead 146 wherein the line level signal is converted into an ADPCM data stream which is transferred to CPU 11 via modem controller 101 and PC bus 100 and stored as an audio file in mass memory 20. In this way, voice messages may be recorded for later use in communication through the telephone line 140. The audio line level signal from operational amplifier 115 is also coupled to the audio output jack 125 via operational amplifier 123. The audio signal at the audio output jack 125 may be coupled to a sound board 27 as shown in FIG. 2 for further processing.

The microphone input 117 is coupled to operational amplifier 115 via the operational amplifier 119 and the transistor switch 121 which may be of conventional design. AND gate 127 closes the transistor switch 121 when the voice control signal from the modem data pump 103 is active and there is no output from the line current sensor. In the event that the handset 142 is picked up while the voice control signal is active, transistor switch 121 is opened to disconnect the microphone input 117 from the operational amplifier 115 and the off-hook signal from modem controller 101 is turned on. The handset 142 is then connected to the modem data pump 103 via the off-hook relay 132 so that voice signals from the handset are applied to the modem data pump 103 and to the audio line output 125. In this way, the handset may be used to produce voice messages that are converted to digital streams in the modem data pump 103 and are transferred therefrom to CPU 11 via the modem controller 101 for storage as voice files in the mass memory 20 of FIG. 2.

As illustrated in FIG. 3, the source of audio output is a mix of handset/telephone line or modem output. That is, the output signal can come from the handset or telephone, from a modem terminal TX1, or from the microphone input 117 or audio line input 113. Any of these sources provides the signal to the audio output 125 via the operational amplifier 123. As described above, the microphone input is switched off by means of the transistor switch 121 when in the voice mode when telephone handset is active.

The modem controller 101 and the modem data pump 103 take an active role in controlling the telephone line 140, the handset 142, and modem reception and transmission of audio and data. The modem controller 101 relies on conventional means to perform these functions, including a line or loop current detector, a ring detector, a voice relay, and an off-hook relay and these elements are included in the data access arrangement 130 and are conventional in their operation.

It is particularly contemplated that the controller board of the present invention will be used in the environment of a desktop or other personal computer, such as an IBM PC-compatible environment operating under DOS or Windows®.

Figure 4:
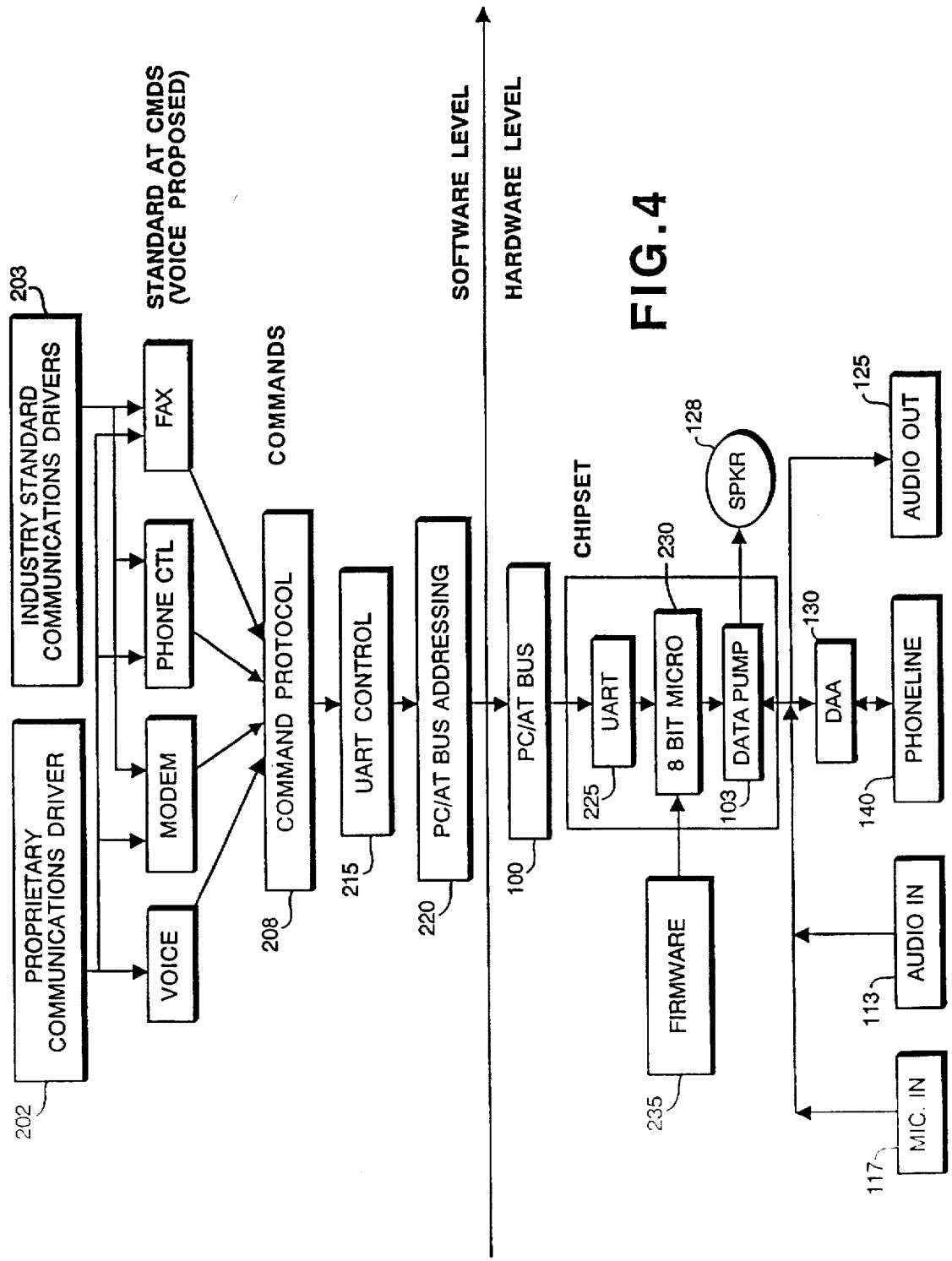
FIG. 4 is a functional block diagram illustrating the control arrangements of the invention.

Control software runs the modem/facsimile/telephone/voice-and-audio record and play applications. The present invention is particularly intended to be compatible with existing third-party modem/facsimile/telephone control software. The relation of these elements is illustrated in FIG. 4. As can be seen, the hardware includes a PC/AT bus connected via a UART (Universal Asynchronous Receiver/Transmitter) to an 8-bit microprocessor, which is driven by firmware. The micro-processor is connected to the data pump, which is connected via the DAA to the MIC. IN, AUDIO IN, AUDIO OUT and telephone line. The data pump also is connected to provide output to an on-board speaker. In the preferred embodiment shown, the UART, microprocessor and data pump are part of a chip set commercially available from Rockwell International Corp.

At the software level, PC/AT bus addressing 220 is provided, above which are, in order, UART control 215 and the well-known protocol commands 208 (e.g., Hayes AT protocol). Standard modem control, telephone control and facsimile control functions are provided in accordance with the informal industry standards established by Hayes (the Hayes AT commands). As no industry-wide standards for voice control have yet been established, it is preferred that the voice control commands follow those proposed by Rockwell. The facsimile control functions can be driven by a standard communications driver 203 (a direct AT command driver), which may also control the modem and telephone control functions. Alternatively or in addition, it is within the scope of the invention for all four types of control functions to be run by a single driver 202.

From the foregoing description, it will be apparent that the present invention provides a single communications controller board having all the communications functions which may be required in an IBM PC-compatible computer environment, including not only the standard modem/ facsimile/telephone control functions, but also microphone-in, audio-line-in and audio-line-out control functions, as well as speaker-output control.

Figure 5:
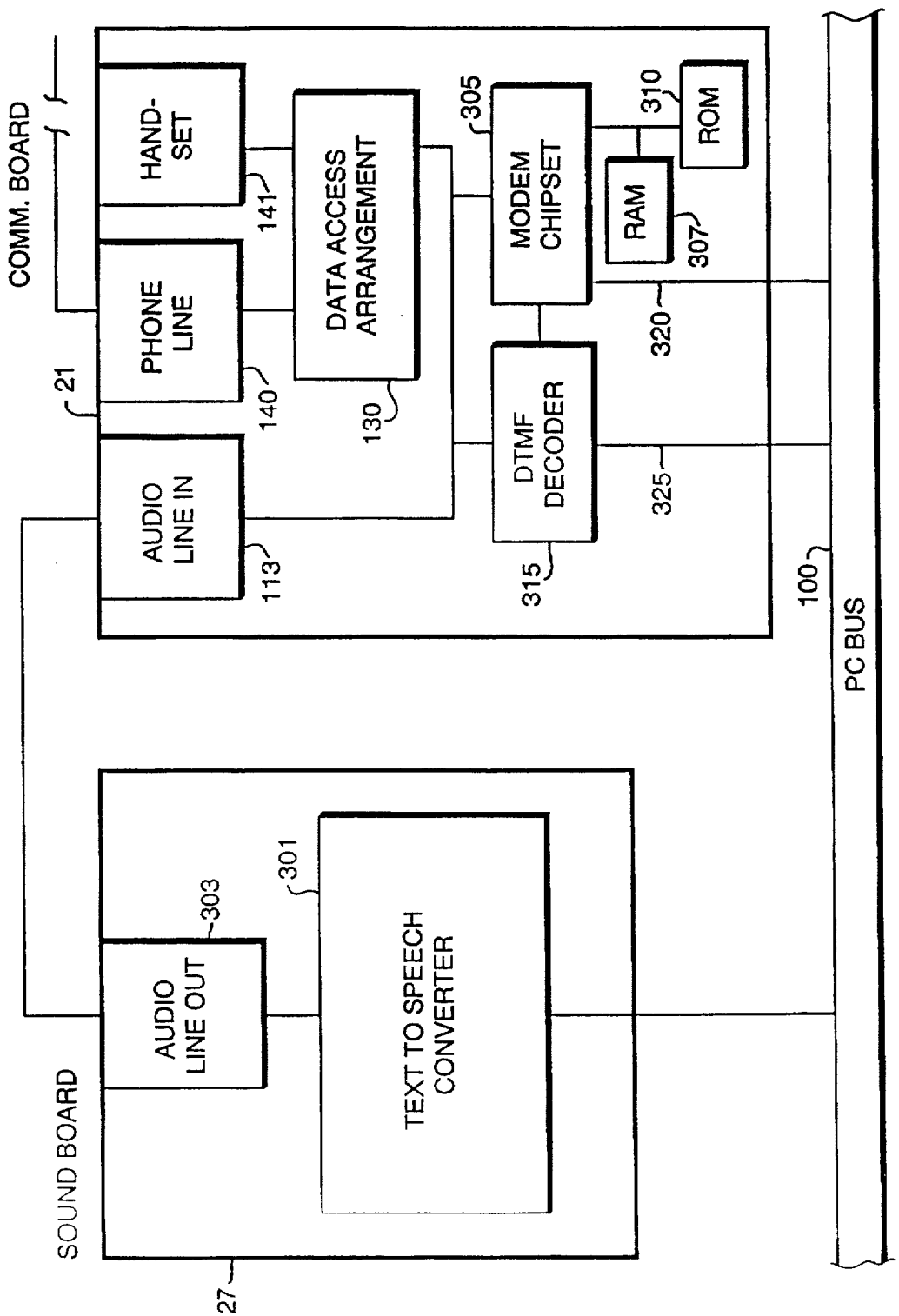
FIG. 5 is detailed block diagram of a second embodiment illustrative of the invention.

FIG. 5 depicts an arrangement of a single board communication controller and a sound board configured as a text-to-speech communication system illustrative of the second embodiment of the invention. In the arrangement of FIG. 5, the sound board 27 includes a text-to-speech converter circuit 301 that effects conversion of text to a PCM data stream representative digitized audio data corresponding to the text and digital to analog conversion of a PCM data stream. The audio output from the digital to analog conversion is coupled as an audio line level signal to the audio line input 113 of the communication controller 21. In the communication controller, the audio signal received from the sound board 27 is played onto the telephone line 140.

The communication controller 21 shown in FIG. 5 generally corresponds to the communication board of FIG. 3. A modem chip set 305 includes the arrangement of the modem controller 101 and the modem data pump 103 shown in FIG. 3 and RAM and ROM memories 307 and 310 of FIG. 5 correspond to the RAM 104 and the EPROM 107 of FIG. 5. A microphone input is not utilized in the circuit arrangement of FIG. 5 and the data access arrangement of FIG. 5 couples the audio signal from the sound board 27 to the telephone line 140 in a manner similar to that described with respect to FIG. 3.

The circuit of FIG. 5 also includes a DTMF decoder coupled between the telephone line 140 and the PC bus 100 which is operative to detect DTMF tones and to send signals corresponding thereto to the CPU 11 of FIG. 2. In response to the DTMF tones, the CPU 11 generates modem command signals which modify the configuration of the modem chip set 305 so that the operation of the communication controller is changed.

Figure 6:
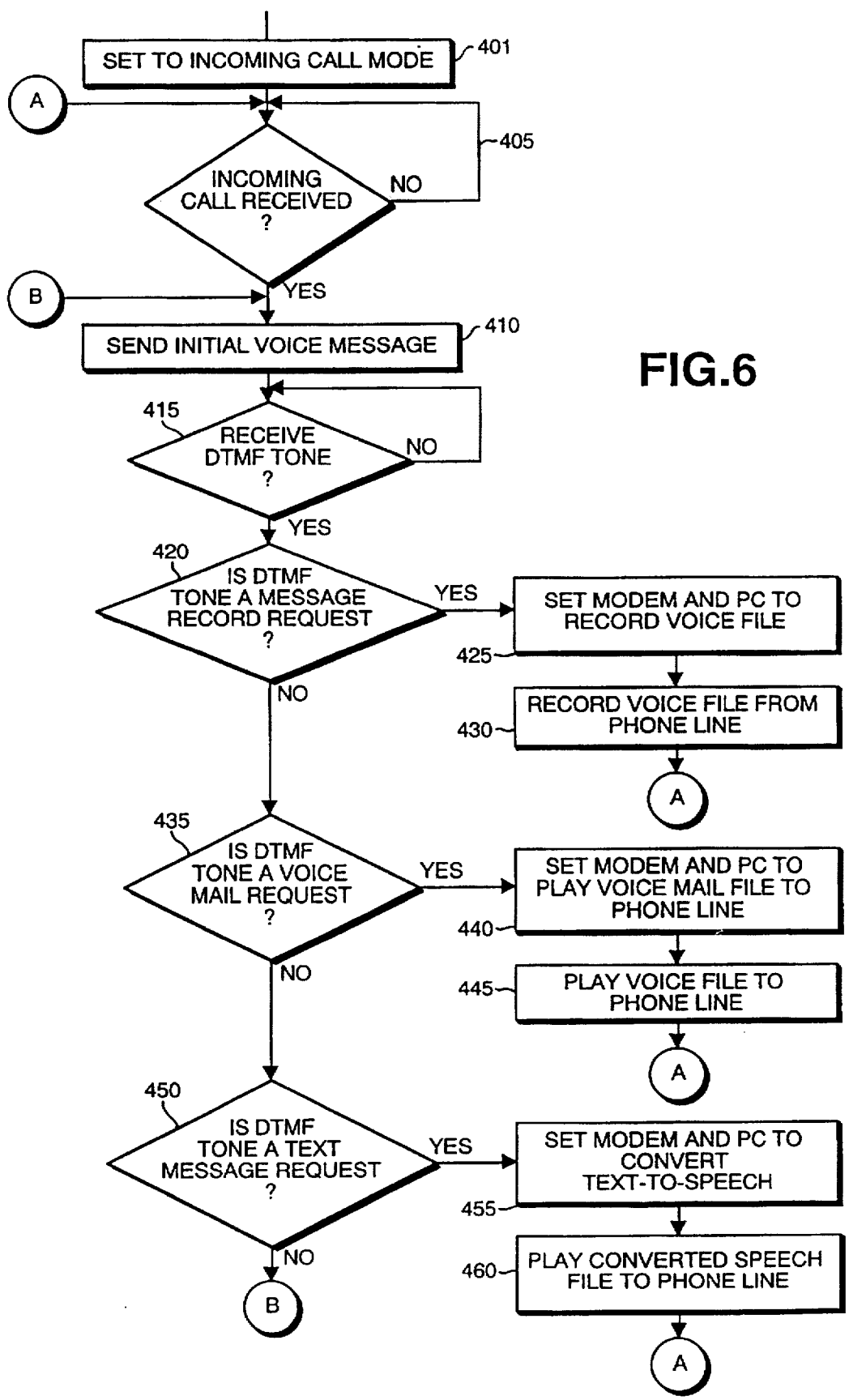
FIG. 6 is a flow chart illustrating an operation of the second embodiment with respect to text to speech conversion in telephone messaging.

The flow chart of FIG. 6 illustrates the operation of the arrangement of FIG. 5 in recording messages from a remote user connected to the telephone line 140 and playing messages for the remote user. Referring to FIG. 6, the communication controller 21 is set to an incoming call mode in step 401 in which it is configured to detect an incoming call on the telephone line 140. Decision step 405 is then entered to detect the occurrence of an incoming call. When receipt of incoming call is detected in the step 405, a signal corresponding to the start of the incoming call is transferred from the modem chip set 305 to the CPU 11 and an initial message is transferred to the text-to-speech converter 301 of the sound board 27 wherein the message is converted into a voice message audio signal corresponding thereto (step 410). The voice message signal is supplied to the audio input 113 of controller 21 and passed through the data access arrangement 130 to the telephone line 140. The message in the step 410 directs the caller to send one of a plurality of DTMF tones to initiate recording of a caller message, request voice mail or request a text message from the communication controller 21.

Control is then passed to decision step 415 in which receipt of a DTMF tone is detected. The DTMF decoder 315 operates to detect a DTMF tone on telephone line 140 and sends a signal to the CPU 11 of FIG. 2 corresponding to the detected tone. When a tone is detected, step 420 is entered and it is determined in CPU 11 whether the detected tone corresponds to a request to record a message. If the message record request tone is detected in the step 420, the CPU 11 sends command signals to the modem chip set 305 to record the incoming voice and prepares to store the digitized data stream from the modem chip set in a voice file in the mass memory 20 of FIG. 2. The voice message from the telephone line 140 is then converted to an ADPCM voice file in the modem chip set 305 and stored in mass memory 20 of FIG. 2. Control is then returned to the step 405 to await receipt of another incoming call.

In the event that the DTMF tone is not a message record request in the step 420, step 435 is entered in which it is determined by the CPU 11 whether the received DTMF tone corresponds to a voice mail request. Upon a determination that a voice mail request has been received, the CPU 11 sets the modem to play a selected voice mail file to the telephone line 140 and retrieves the voice file from mass memory 20 (step 440) and sends the file to the modem chip set 305. The modem chip set operates to convert the voice file from the PC bus 100 to a audio signal and passes the audio signal to the telephone line 140 via the data access arrangement 130 (step 445).

If the DTMF tone is not a voice mail request in the step 435, step 450 is entered to ascertain whether the DTMF tone is a text message. When a text message is determined, step 455 is entered. The CPU 11 then configures the communication controller 21 to receive an audio signal at the audio line input from the sound board 27 and sends the text file to text-to-speech converter 301 (step 440). The text file is converted to a PCM speech data stream and further converted to an audio signal in the text-to-speech converter 301. The converted audio signal is transferred to the audio input 113 of the communication controller 21 and coupled therefrom to the telephone line 140. Control is then returned to step 405. When the DTMF tone does not correspond to a message record request, a voice mail request or a text message request, control is passed to step 410 to repeat the initial voice message.

The text to be converted to speech in the text message request can be received in any form and from any source, such as from an internal file already in the host computer, or as a facsimile and telephone-line transmission. Whatever its origin, the data is converted by the text-to-speech circuit 305 of the sound board 27 as described with respect to FIG. 5 using for that purpose any known hardware or software approach, such as the Emerson-Stern algorithm. After the data has been converted to an audio file, the audio file is transferred to the single-board controller via the audio input 113 of the latter, and is sent out over the telephone line at the appropriate time. The manner of controlling this procedure is not part of the present invention, but as stated above one example of such controller is disclosed in commonly-assigned application Ser. No. 07/978,440 (the disclosure of that application is incorporated herein by reference, to the extent such disclosure may be necessary to a full understanding of the present invention).

As a variant of the arrangement shown in FIG. 5, the text-to-speech control or conversion function may be provided on the single board controller, further simplifying the structure.

While the present invention has been discussed in detail with reference to the preferred embodiments thereof, many modifications and variations of the invention will now be apparent to those of ordinary skill in the art. Accordingly, the scope of the present invention is not to be limited by the details of the preferred embodiments illustratively disclosed herein, but only by the terms of the appended claims.

What is claimed is:

1. A control board comprising:

a communication board for communicating between a digital computer interface and a telephone interface;

tone signal detecting means for detecting and decoding tone signals transmitted through the telephone interface;

a sound board, having means for retrieving stored text data and for effecting digital-analog conversion of the retrieved text data into digitized speech as an audio signal, the digitized speech being coded in a PCM coding format;

audio control means, for performing audio-line level output and audio-line level input control functions, said audio control means including means for mixing and adjusting an input signal from an audio input or said sound board to a common signal level to generate an audio output signal, and, wherein said audio control means is provided on said communication board;

telephone interface control means for (i) performing modem/facsimile/voice telephone interface control functions to control signal flows between the computer interface and the telephone interface and between said audio control means and the telephone interface, (ii) converting audio portions of input/output modem/facsimile/voice telephone signals into an ADPCM coding format, and (iii) converting signals of the ADPCM coding format from the computer interface into audio signals, said telephone interface control means being provided an said communication board, wherein the audio control means supplies the audio signal to the voice telephone interface control function of said telephone interface control means on said communication board to be output through the telephone interface; and means responsive to a decoded tone signal for (i) configuring said telephone interface control means so as to convert an audio portion of a telephone signal received by the telephone interface to an ADPCM coding format for transfer to the computer interface and storage as a voice file in response to correspondence of the decoded tone signal to a first predefined value, and (ii) retrieving an ADPCM voice file to said telephone interface control means through the computer interface and configuring said telephone interface control means to convert the ADPCM voice file from the computer interface to an audio signal for transfer to the telephone interface in response to correspondence of the decoded tone signal to a second predefined value, and (iii) initiating retrieval and conversion of a stored text file into an audio signal by said sound board for transmission to said audio control means and configuring said telephone interface control means to receive the audio output signal from said audio control means that has been converted from the PCM format for transfer to the telephone interface in response to correspondence of the decoded tone signal to a third predefined value.

2. A control board according to claim 1, wherein said audio control means further comprises means for applying audio signals to said telephone interface control means and said telephone interface control means further comprises means for digitally encoding the audio signals.

3. A control board according to claim 2, wherein said means for applying the audio signals to said telephone interface control means further comprises a microphone and a telephone handset and means responsive to a signal from said telephone interface control means for selecting between the microphone and the telephone handset as a source of the audio signals.

4. A controller board, comprising:

a communication board;

a dual tone multiple frequency (DTMF) detector which detects and decodes DTMF signals transmitted through a telephone interface;

an audio controller which controls audio-line level output and audio-line level input control functions, said audio controller including an audio input, and means for mixing and adjusting an input signal from the audio input to a common signal level, and, wherein said audio controller is provided on said communication board;

a sound board, having means for effecting digital-to-analog conversion of text into digitized speech as an audio signal and means for supplying the audio signal to said audio controller on said communication board, the digitized speech being coded in a PCM coding format;

a telephone interface controller which (i) performs modem/facsimile/voice telephone interface control functions to control signal flows between a computer interface and the telephone interface and between said audio controller and the telephone interface, (ii) converts audio portions-of input/output modem/facsimile/voice telephone signals into an ADPCH coding format, and (iii) converts signals of the ADPCM coding format from the computer interface into audio signals, said telephone interface controller being provided on said communication board; and a control board configuration modifier which, in response to a DTMF signal detected by the dual tone multiple frequency detector, (i) configures said telephone interface controller to convert an audio portion of a telephone signal received by the telephone interface to an ADPCM coding format for transfer to the computer interface and storage as a voice file in response to correspondence of the detected DTMF signal to a first predefined value, and (ii) retrieves an ADPCM voice file to said telephone interface controller through the computer interface and configures said telephone interface controller to convert the ADPCM voice file from the computer interface to an audio signal for transfer to the telephone interface in response to correspondence of the detected DTMF signal to a second predefined value, and (iii) initiates conversion of a stored text file into an audio signal by said sound board for supply to said audio controller and configures said telephone interface controller to receive an audio signal from said audio controller that has been converted from the PCM coding format for transfer to the telephone interface in response to correspondence of the detected DTMF signal to a third predefined value, wherein said audio signal, which has been mixed and adjusted to a common signal level, is output by said audio controller to said telephone interface controller which outputs the audio signal over a telephone line interface utilizing the voice telephone interface control function.

5. A communication controller comprising:

a communication control board including (i) audio control means for controlling audio-line level communication with a digital computer interface and a telephone interface, said audio control means including an audio input, and means for mixing and adjusting an input signal from the audio input to a common signal level, and (ii) telephone interface control means for performing modem/facsimile/voice telephone interface communication between the digital computer interface and the telephone interface and between said audio control means and the telephone interface and for converting audio-portions of modem/facsimile/voice telephone signals into an ADPCM coding format and for converting signals of the ADPCM coding format from the digital computer interface into audio signals, said telephone interface control means being provided between the digital computer interface and the telephone interface;

a dual tone multiple frequency detector which actuates and decodes DTMF signals transmitted through the telephone interface;

a sound board comprising means responsive to data signals from the digital computer interface for converting the data signals into digitized speech signals and means for supplying the digitized speech signals to said audio control means, the digitized speech signals being coded in a PCM coding format;

a control board configuration modifier which, in response to a DTMF signal detected by the dual tone multiple frequency detector, (i) configures the telephone interface control means to convert an audio portion of a telephone signal received by the telephone interface to an ADPCM coding format for transfer to the digital computer interface and storage as a voice file in response to correspondence of the detected-DTMF signal to a first predefined value, and (ii) retrieves an ADPCM voice file to said telephone interface control means through the digital computer interface and configures said telephone interface control means to convert an ADPCM voice file from the computer interface to an audio signal for transfer to the telephone interface in response to correspondence of the detected DMF signal to a second predefined value, and (iii) initiates transfer of a stored data file to said sound board for conversion into a digitized speech signal for supply to said audio control means and configures said telephone interface control means to receive an audio signal from said audio control means that has been converted from the PCM format for transfer to the telephone interface in response to correspondence of the detected DTMF signal to a third predefined value, wherein said audio signal which has been mixed and adjusted to a common signal level is output by said audio control means to said telephone interface control means which directly outputs the audio signal over the telephone interface utilizing a voice communication function.

6. A communication controller comprising:

a communication board including a telephone interface and a digital computer interface;

audio control means for performing audio-line level input/output control functions including audio signal output over the telephone interface, said audio control means including an audio input, and means for mixing and adjusting an input signal from the audio input to a common signal level, and, wherein said audio control means is provided on said communication board;

a dual tone multiple frequency detector which detects and decodes DTMF signals transmitted through the telephone interface;

a sound board, having means for effecting digital to analog conversion of text data on the digital computer interface into an audio signal, and for supplying the audio signal to said audio control means on said communication board, the audio signal coded in a PCM coding format;

a telephone interface control means for (i) performing modem/facsimile/voice telephone functions to control signal flows between the digital computer interface and the telephone interface and between said audio control means and the telephone interface, (ii) converting audio portions of modem/facsimile/voice telephone signals into an ADPCM coding format, and (iii) converting signals of the ADPCM coding format from the digital computer interface into audio signals, said telephone interface control means being provided on said communication board; and a control board configuration modifier which, in response to a DTMF signal detected by the dual tone multiple frequency detector, (i) configures the telephone interface control means to convert an audio portion of a telephone signal received by the telephone interface to an ADPCM coding format for transfer to the computer interface and storage as a voice file in response to correspondence of the detected DTMF signal to a first predefined value, and (ii) retrieves an ADPCM voice file to said telephone interface control means through the computer interface and configures said telephone interface control means to convert the ADPCM voice file from the computer interface to an audio signal for transfer to the telephone interface in response to correspondence of the detected DTMF signal to a second predefined value, and (iii) initiates transfer of stored text data to said sound board for conversion into an audio signal for supply to said audio control means and configures said telephone interface control means to receive an audio signal from said audio control means that has been converted from the PCM format for transfer to the telephone interface in response to correspondence of the detected DTMF signal to a third predefined value, wherein, said audio signal which has been mixed and adjusted to a common signal level is output by said audio control means to said telephone interface control means which directly outputs the audio signal over the telephone interface utilizing the voice telephone function.

7. A communication controller according to claim 6, wherein said telephone interface control means further comprises means for digitally encoding audio signals onto the digital computer interface.

8. A communication controller according to claim 6, wherein said audio control means further comprises means for supplying an audio signal to said telephone interface control means and wherein said telephone interface control means transmits the audio signal through the telephone interface.

9. A telecommunications board, comprising:

a communication board having a digital computer interface and a telephone interface;

an audio controller, residing on said communication board, for controlling audio-line-level input/output of audio signals, said audio controller including an audio input, and means for mixing and adjusting an input signal from said audio input to a common signal level;

a text-to-speech converter for converting text into digitized speech as an audio signal, the digitized speech being coded in a PCM coding format;

an audio signal output device for supplying the audio signal to the audio controller for audio-line-level control;

a dual tone multiple frequency signal detector for detecting tone signals transmitted through the telephone interface;

a telephone interface controller, residing on the communication board, for (i) controlling facsimile/modem/voice telephone interface functions to control signal flows between the digital computer interface and the telephone interface and between said audio controller and the telephone interface, (ii) converting audio portions of facsimile/modem/voice telephone signals into an ADPCM coding format, and (iii) converting signals of the ADPCM coding format from the digital computer interface into audio signals; and a control board configuration modifier which, in response to a tone signal detected by the dual tone multiple frequency detector, (i) configures the telephone interface controller to convert an audio portion of a telephone signal received by the telephone interface to an ADPCM coding format for transfer to the computer interface and storage as a voice file in response to correspondence of the detected tone signal to a first predefined value, and (ii) retrieves an ADPCM voice file to said telephone interface controller through the computer interface and configures the telephone interface controller to convert the ADPCM voice file from the computer interface to an audio signal for transfer to the telephone interface in response to correspondence of the detected tone signal to a second predefined value, and (iii) initiates transfer of a stored text file to said text-to-speech converter for conversion into an audio signal and configures the telephone interface controller to receive an audio signal from the audio controller that has been converted from the PCM format for transfer to the telephone interface in response to correspondence of the detected tone signal to a third predefined value.

10. A communication control board, comprising:

a sound board having means for converting a text file to a sound file in a PCM coding format and the sound file from the PCM coding format and outputting the converted sound file as an audio signal;

audio control means for controlling audio line level input/output control functions, said audio control means for providing mixing and adjusting of an input audio signal, which is from the PCM coding format from said sound board, to a common signal level;

a communication board for interfacing between a digital computer interface and a telephone interface, said communication board including a telephone interface control means for (i) performing modem/facsimile/voice telephone interface control functions, to control signal flows between the digital computer interface and the telephone interface and between said audio control means and the telephone interface, (ii) converting audio portions of input/output modem/facsimile/telephone signals into an ADPCM coding format, and (iii) converting signals of the ADPCM coding format from the digital computer interface to audio signals, wherein said telephone interface controls the modem/facsimile/voice telephone functions between the digital computer interface and the telephone interface;

a dual tone multiple frequency detector which detects and decodes DTMF signals transmitted through the telephone interface; and a control board configuration modifier which, in response to a DTMF signal detected by the dual tone multiple frequency detector, (i) configures the telephone interface control means to convert an audio portion of a telephone signal received by the telephone interface to an ADPCM coding format for transfer to the computer interface and storage as a voice file in response to correspondence of the detected DTMF signal to a first predefined value, and (ii) retrieves an ADPCM voice file to said telephone interface control means through the computer interface and configures the telephone interface control means to convert the ADPCM voice file from the computer interface to an audio signal for transfer to the telephone interface in response to correspondence of the detected DTMF signal to a second predefined value, and (iii) initiates retrieval and conversion of a stored text file by said sound board for output to said audio control means and configures said telephone interface control means to receive an audio signal from said audio control means that has been converted from the PCM format for transfer to the telephone interface in response to correspondence of the detected DTMF signal to a third predefined value, wherein the audio signal which has been mixed and adjusted to a common signal level is output by said audio control means to said telephone interface control means which directly outputs the audio signal over the telephone line utilizing the voice telephone interface function.

11. A computer having a digital computer interface and a control board, said control board comprising:

a communication board for communicating between the digital computer interface and a telephone interface;

a sound board, having means for retrieving stored text data and for effecting digital-analog conversion of text data into digitized speech as an audio signal, the digitized speech being coded in a PCM coding format;

audio control means, for performing audio-line level output and audio-line level input control functions, said audio control means including means for mixing and adjusting an input signal from an audio input or said sound board to a common signal level to generate an audio output signal, and, wherein said audio control means is provided on said communication board;

telephone interface control means for (i) performing modem/facsimile/voice telephone interface control functions to control signal flows between the digital computer interface and the telephone interface and between said audio control means and the telephone interface, (ii) converting audio portions of input/output modem/facsimile/voice telephone signals into an ADPCM coding format, and (iii) converting signals of the ADPCM coding format from the digital computer interface into audio signals, said telephone interface control means being provided on said communication board, wherein the audio control means supplies the audio signal to the voice telephone interface control function of the telephone interface control means on the communication board to be output through the telephone interface;

tone signal detecting means for detecting and decoding tone signals transmitted through the telephone interface; and means responsive to a decoded tone signal for (i) configuring said telephone interface control means so as to convert an audio portion of a telephone signal received by the telephone interface to an ADPCM coding format for transfer to the computer interface and storage as a voice file in response to correspondence of the decoded tone signal to a first predefined value, and (ii) retrieving an ADPCH voice file to said telephone interface control means and configuring said telephone interface control means to convert the ADPCM voice file from the computer interface to an audio signal for transfer to the telephone interface in response to correspondence of the decoded tone signal to a second predefined value, and (iii) initiating retrieval and conversion of a stored text file by said sound board for input to said audio control means and configuring said telephone interface control means to receive an audio signal from said audio control means that has been converted from the PCM format for transfer to the telephone interface in response to correspondence of the decoded tone signal to a third predefined value.

12. A communication control apparatus comprising:

a computer for sending data to and receiving data from a digital computer interface;

a digital document scanner for inputting data to said computer;

a printer for outputting data from said computer;

a communication board for communicating between the digital computer interface and a telephone interface;

a sound board, having means for retrieving stored text data and for effecting digital-analog conversion of text data into digitized speech as an audio signal, the digitized speech being coded in a PCM coding format;

audio control means, for performing audio-line level output and audio-line level input control functions, said audio control means including means for mixing and adjusting an input signal from an audio input or said sound board to a common signal level to generate an audio output signal, and, wherein said audio control means is provided on said communication board, wherein the audio control means supplies the audio signal to the voice telephone interface control function of the telephone interface control means on the communication board to be output through the telephone interface;

telephone interface control means for (i) performing modem/facsimile/voice telephone interface control functions to control signal flows between the digital computer interface and the telephone interface and between said audio control means and the telephone interface, (ii) converting audio portions of input/output modem/facsimile/voice telephone signals into an ADPCM coding format, and (iii) converting signals of the ADPCM coding format from the digital computer interface into audio signals, said telephone interface control means being provided on said communication board;

tone signal detecting means for detecting and decoding tone signals transmitted through the telephone interface; and means responsive to a decoded tone signal for (i) configuring said telephone interface control means so as to convert an audio portion of a telephone signal received by the telephone interface to an ADPCM coding format for transfer to the computer interface and storage as a voice file in response to correspondence of the decoded tone signal to a first predefined value, and (ii) retrieving an ADPCM voice file to said telephone interface control means over the computer interface and configuring said telephone interface control means to convert an ADPCM signal from the computer interface to an audio signal for transfer to the telephone interface in response to correspondence of the decoded ton signal to a second predefined value, and (iii) initiating retrieval and conversion of a stored text file by said sound board for input to said audio control means and configuring said telephone interface control means to receive an audio signal from said audio control means that has been converted from the PCM format for transfer to the telephone interface in response to correspondence of the decoded tone signal to a third predefined value.

13. A control board comprising:

a digital computer;

a communication board for communicating between said digital computer and a telephone interface; and a sound board;

said digital computer including (i) a memory for storing at least digitally coded text files and adaptive pulse code modulated (ADPCM) signals as voice files, and (ii) a processor for selectively transferring ADPCM voice files between the communication board and the memory and for selectively transferring text files to the sound board;

said communication board including (i) an audio mixer for receiving audio signals from an audio line, one of a microphone and a telephone handset and a telephone line and outputting a predetermined level audio signal, (ii) a signal processor for converting the predetermined level audio signal into ADPCM signals for transfer to the digital computer memory, for converting stored ADPCM signals from the digital computer memory into audio signals for transfer to the telephone interface, and for transferring audio signals from the sound board to the telephone interface, (iii) a controller for performing modem/facsimile/voice control function, and (iv) a dual tone multifrequency (DTMF) decoder for decoding DTMF signals received from the telephone interface;

said sound board including (i) a text-to-speech converter for converting text files stored in the memory and accessed by the digital computer processor to PCM signals and (ii) an outputting unit for outputting the PCM signals from the text-to-speech converter as audio signals, wherein the communication board controller:

(i) responsive to decoded DTMF signals from the DTMF decoder being a first predetermined value, controls the digital computer processor to send a signal to the communication board signal processor to set the communication board signal processor into a record mode in which the communication board processor converts an audio portion of a signal received from the telephone interface into ADPCM signals and sends the converted ADPCM signals to the digital computer memory as an ADPCM voice file, (ii) responsive to decoded DTMF signals from the DTMF decoder being a second predetermined value, controls the digital computer processor to retrieve a selected ADPCM voice file in the digital computer memory for transfer to the communication board processor and to set the communication board processor to a playback mode in which the communication board processor converts the selected ADPCM voice file to an audio signal for transfer to the telephone interface, and (iii) responsive to decoded DTMF signals from the DTMF decoder being a third predetermined value, controls the digital computer processor to retrieve a stored text file from the digital computer memory, to set the sound board to convert the retrieved text file into an audio signal and to set the communication board processor to receive the audio signal corresponding to the retrieved text file output from the sound board for transfer to the telephone interface.

14. A control board according to claim 13, wherein said memory in said digital computer comprises mass storage memory.

* * * * *

UNITED STATES PATENT AND TRADEMARK OFFICE
CERTIFICATE OF CORRECTION

PATENT NO. : 5,802,150

DATED : September 1, 1998

INVENTORS : GREGORY F. BECK, et al.

It is certified that error appears in the above-identified patent and that said Letters Patent is hereby corrected as shown below:

COLUMN 1

Line 16, change "computing," to --computing--.

COLUMN 2

Line 41, change "is" to --is a--.

COLUMN 8

Line 22, change "a" to --an--.

Line 60, change "control -or" to --control or--.

COLUMN 10

Line 28, change "portions-of" to --portions of--.

Line 29, change "ADPCH" to --ADPCM--.

UNITED STATES PATENT AND TRADEMARK OFFICE
CERTIFICATE OF CORRECTION

PATENT NO. : 5,802,150

DATED : September 1, 1998

INVENTORS : GREGORY F. BECK, et al.    Page 2 of 2

It is certified that error appears in the above-identified patent and that said Letters Patent is hereby corrected as shown below:

COLUMN 11

Line 8, change "audio-portions" to --audio portions--

Line 31, change "detected-DTMF" to --detected DTMF--.

Line 38, change "DMF" to --DTMF--.

COLUMN 16

Line 4, change "ton" to --tone--.

Signed and Sealed this

Eleventh Day of May, 1999

*Attest:*

Q. TODD DICKINSON

*Attesting Officer*    Acting Commissioner of Patents and Trademarks